United States Patent
Yamazaki et al.

(10) Patent No.: US 7,421,774 B2
(45) Date of Patent: Sep. 9, 2008

(54) WINDING METHOD FOR STATOR OF MOTOR

(75) Inventors: Akihiko Yamazaki, Fukui (JP); Kenzi Sasaki, Fukui (JP); Yasutake Seki, Fukui (JP); Koh Kajita, Gifu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 419 days.

(21) Appl. No.: 10/529,036

(22) PCT Filed: Sep. 29, 2003

(86) PCT No.: PCT/JP03/12453

§ 371 (c)(1),
(2), (4) Date: Mar. 24, 2005

(87) PCT Pub. No.: WO2004/032311

PCT Pub. Date: Apr. 15, 2004

(65) Prior Publication Data

US 2006/0042072 A1    Mar. 2, 2006

(30) Foreign Application Priority Data

Oct. 4, 2002    (JP) .............................. 2002-292164

(51) Int. Cl.
*H02K 15/00* (2006.01)

(52) U.S. Cl. .............................. 29/596; 29/598; 29/605; 242/432.1

(58) Field of Classification Search ........... 29/596–598, 29/605–609, 732–736; 242/432.4; 310/42, 310/207; 140/91.1, 91.2
See application file for complete search history.

(56) References Cited

U.S. PATENT DOCUMENTS

| | | | | |
|---|---|---|---|---|
| 4,918,347 A | * | 4/1990 | Takaba ....................... | 310/179 |
| 5,090,110 A | * | 2/1992 | Murakoshi et al. ............ | 29/596 |
| 6,782,600 B2 | * | 8/2004 | Yamazaki et al. ............. | 29/596 |
| 7,281,312 B2 | * | 10/2007 | Sadiku et al. ................. | 29/596 |

FOREIGN PATENT DOCUMENTS

| | | |
|---|---|---|
| JP | 2000-270524 | 9/2000 |
| JP | 2001-103716 | 4/2001 |
| JP | 2001-119885 | 4/2001 |
| JP | 2001-339917 | 12/2001 |
| JP | 2002-78300 | 3/2002 |
| JP | 2002-14216 | 5/2002 |

* cited by examiner

*Primary Examiner*—Minh Trinh
(74) *Attorney, Agent, or Firm*—Steptoe & Johnson LLP (57) ABSTRACT

According to a nozzle winding method of causing a nozzle (41) to pass between adjacent magnetic poles (12) and rotating the nozzle (41) around the magnetic pole (12), winding is carried out until the rotating nozzle (41) interferes with wound coils (201 to 242), so that a high space factor is obtained. Thereafter, according to a cam winding method, winding is carried out in a space remaining in a slot while rotating the nozzle (41) in an area not interfering with the coils (201 to 242) in the slot, thereby achieving winding with a high space factor of coils in the entire space of the slot.

5 Claims, 5 Drawing Sheets

WINDING METHOD FOR STATOR OF MOTOR

TECHNICAL FIELD

The present invention relates to a stator of a motor and a winding method thereof for directly performing concentrated winding on magnetic poles disposed radially in integrally laminated stator cores.

BACKGROUND ART

Motors account for a major proportion of total power consumption. Since the preservation of global environment is demanded, higher efficiency and labor savings are inevitable problems to be pursued.

As a solution for higher efficiency of motors, the improvement of coil space factors of stator windings has been constantly pursued as the most significant object in the development of winding methods.

Figure 5:
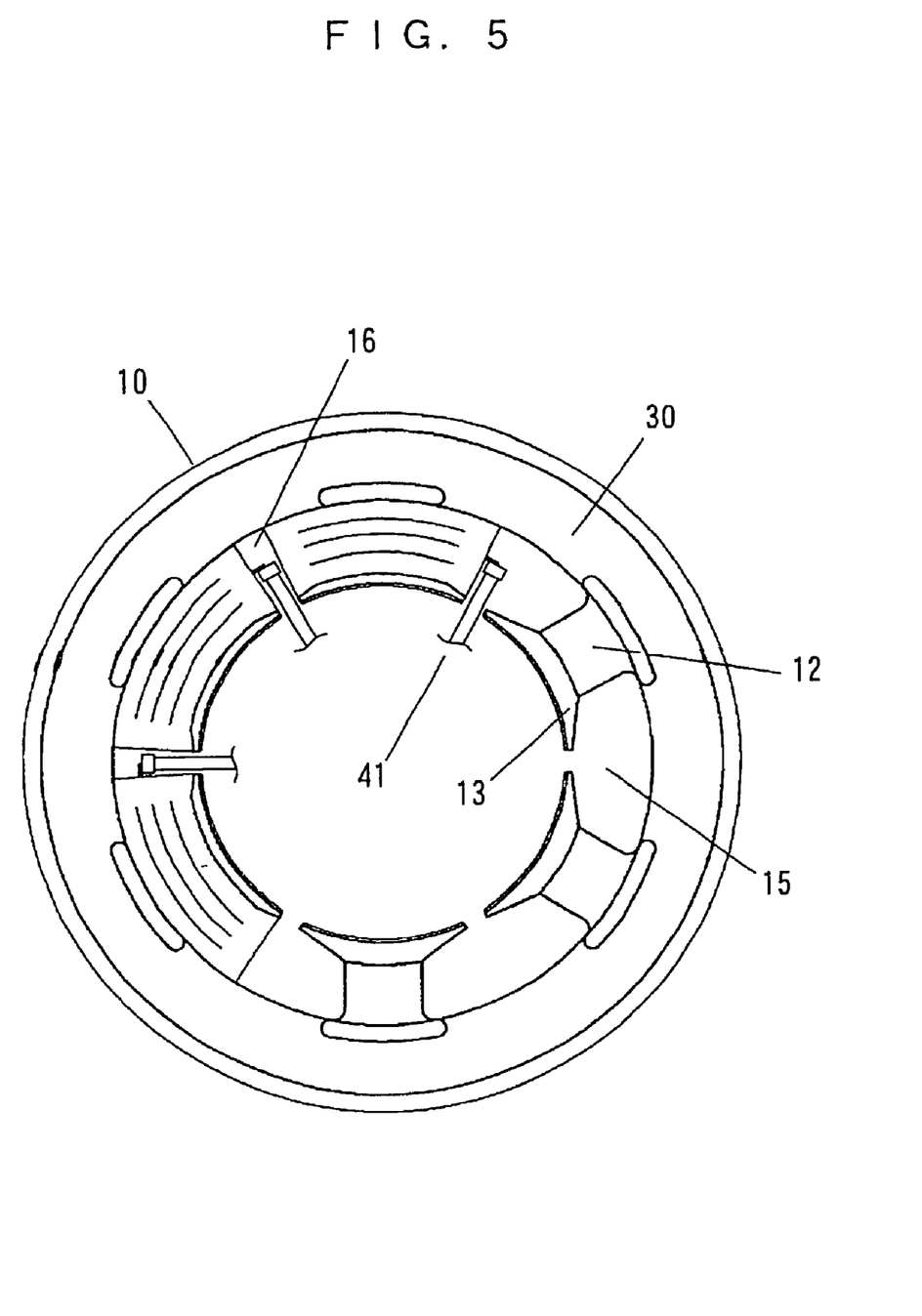
FIG. 5 is a plan view showing conventional nozzle winding.

Referring to FIG. 5, a conventional winding method will be described below.

A nozzle winding method of in-slot nozzle oscillation winding is in the mainstream of conventional winding methods. In this method, when concentrated windings are provided directly on magnetic poles 12 which are disposed radially in a stator core 10 in an integrated manner, a nozzle 41 is inserted, from the inside of the stator core 10, into a slot 15 formed by the adjacent magnetic poles 12 and magnetic pole protrusions 13, and winding is performed while the nozzle 41 is rotated around the magnetic pole 12.

Although the nozzle winding method achieves high-speed winding with ease, winding cannot be performed in a nozzle passage area 16 in the slot 15 and thus the coil space factor of winding cannot be improved more than a certain degree.

As a conventional method of winding in the nozzle passage area 16, a method of combining insertion winding and nozzle winding is known in which winding is not performed directly (e.g., Japanese Patent Laid-Open No. 2002-142416). With this method, two coils are formed and combined by using the two methods, thereby achieving windings utilizing all effective slot areas.

Further, a winding method not causing a nozzle to pass through a slot is also known (e.g. Japanese Patent Laid-Open No. 2000-270524 or Japanese Patent Laid-Open No. 2001-103716). According to this method, winding can be performed without the necessity for the nozzle 41 to enter the slot 15 and thus winding can be performed in the nozzle passage area 16 during nozzle winding. Further, the size of the nozzle becomes less limited and it becomes possible to perform multiple winding for supplying a plurality of conductors at a time.

DISCLOSURE OF THE INVENTION

Although winding methods for utilizing all the effective slot areas have been developed, various problems are left in the pursue of practical mass production methods and effectiveness of products.

For example, in the method of Japanese Patent Laid-Open No. 2002-142416 where insertion winding is combined with nozzle winding, coils are connected on a large number of points, and as the number of poles becomes larger, the number of coils is also increased. Hence, this method is not preferable in quality and the number of steps. Further, unlike nozzle winding, coils are not directly wound in insertion winding and thus additional coil fixing unit is necessary. Hence, this method is not preferable in quality and the number of steps.

In the method of Japanese Patent Laid-Open No. 2000-270524 or Japanese Patent Laid-Open No. 2001-103716 where the nozzle is not caused to pass through the slot, since winding is carried out while the nozzle hangs a coil over a hook, a winding number of turns is not increased and thus winding requires a longer time. The larger winding number, this problem becomes more serious. Further, it is considerably difficult to control the position of winding the coil. Particularly a lower portion of the coil to be wound has a longer distance from the hook and thus the position cannot be controlled. Even if the entire slot is used without the passage of the nozzle through the slot, it is difficult to increase a coil space factor higher than ordinary nozzle winding which causes the nozzle to pass through the slot. Moreover, the nozzle is disposed on the inner side and thus the coil directly passes through a slot open and is supplied in the slot. Hence, a problem arises in the securing of the quality of the coil against a coil flaw and so on.

The present invention is devised to solve the above-described problems and has as its object the provision of a winding method for a stator of a motor that improves a coil space factor and achieve coils of high quality.

In order to solve the above-described problems, a winding method for a stator of the present invention, for carrying out stator windings around magnetic poles disposed radially in a stator core, comprises: a first winding step of winding first coils around magnetic poles corresponding to phases until a nozzle interferes with a wound conductor, the coils being wound according to a nozzle winding method of rotating, relative to the magnetic pole, the nozzle inserted in a slot formed by the adjacent magnetic poles and magnetic pole protrusions of the stator core; a nozzle moving step of retracting the nozzle having been inserted in the slot from an area interfering with the first coils; and a second winding step of winding second coils in series on the first coils according to a hook winding method of moving a conductor supplied from the nozzle to a prescribed position by using hooks provided on the coil end of the stator core while rotating the nozzle relative to the magnetic pole on a retracting position of the nozzle moving step. Therefore, winding can be carried out in the passage space of the nozzle, a space factor of coils is improved by sufficiently making the best use of the characteristics of the conventional nozzle winding method and the hook winding method, and winding is carried out while securing quality. Further, winding is performed with fewer connecting points of coils by continuously forming coils via crossovers.

Further, a winding method for a stator of the present invention, for carrying out stator windings around magnetic poles disposed radially in a stator core, comprises: a first winding step of winding first coils around magnetic poles corresponding to phases until a nozzle interferes with a wound conductor, the coils being wound according to a nozzle winding method of rotating, relative to the magnetic pole, the nozzle inserted in a slot formed by the adjacent magnetic poles and magnetic pole protrusions of the stator core; a step of cutting the last winding end wire of the first coils while depositing the winding end wire on a predetermined position, and depositing the first winding start wire of the second coils on the predetermined position; and a second winding step of winding second coils in series on the first coils, which have been wound in the first winding step, according to a hook winding method of moving a conductor supplied from the nozzle to a prescribed position by using hooks provided on the coil end of the stator core while rotating another nozzle relative to the magnetic pole on a position retracting from an interference area of the nozzle and the first coil. In addition to the first winding step which is the ordinary nozzle winding method, the second coils are wound in series on the first coils, which have been wound in the first winding step, according to the hook winding method while the nozzle is disposed in an area not interfering with the coil in the slot and the nozzle and the stator core are rotated relative to each other, thereby securing coils of high quality with a high space factor and a small number of winding steps.

Additionally, the rotation of the nozzle relative to the magnetic pole in the first winding step is a rotation made by the nozzle.

Moreover, the second coil wound in series with the first coil is wound around one of the magnetic poles in the second winding step by moving the conductor substantially in a radial direction along the center lines of the slots adjacent to each other on both sides of the magnetic pole by using two hooks provided on the coil end.

Besides, the conductor supplied from the nozzle is moved to a prescribed position by the hooks provided on the coil end of the stator core, the conductor held by the hooks on the coil end of the winding side is released, and winding is carried out while a slack wire is eliminated by hooks holding the conductor on the other coil end. A slack wire inevitably appearing via the hooks on both of the coil ends is absorbed by the hooks holding the conductor on one of the coil ends when the conductor is wound on the other coil end. Thus, winding is carried out while tension is constantly applied without pulling back the conductor into the nozzle again and the coil of high quality can be wound with a high space factor and few coil damages.

Further, winding is sequentially carried out continuously via crossovers in the first winding step or the second winding step. Since winding is continuously carried out via the crossovers, it is possible to wind the coils utilizing all effective slot areas with a high space factor and manufacture a stator of a series star connection with few faulty connections in a small number of steps.

Further, the first coils, the second coils, and the first and second coils in each phase are sequentially wound continuously via the crossovers. Since winding is carried out continuously via the crossovers, it is possible to wind the coils utilizing all the effective slot areas with a high space factor and manufacture a stator of a series star connection with few faulty connections in a small number of steps.

BEST MODE FOR CARRYING OUT THE INVENTION

Referring to FIGS. 1 to 4, embodiments of the present invention will be described below.

EMBODIMENT 1

Figure 1:
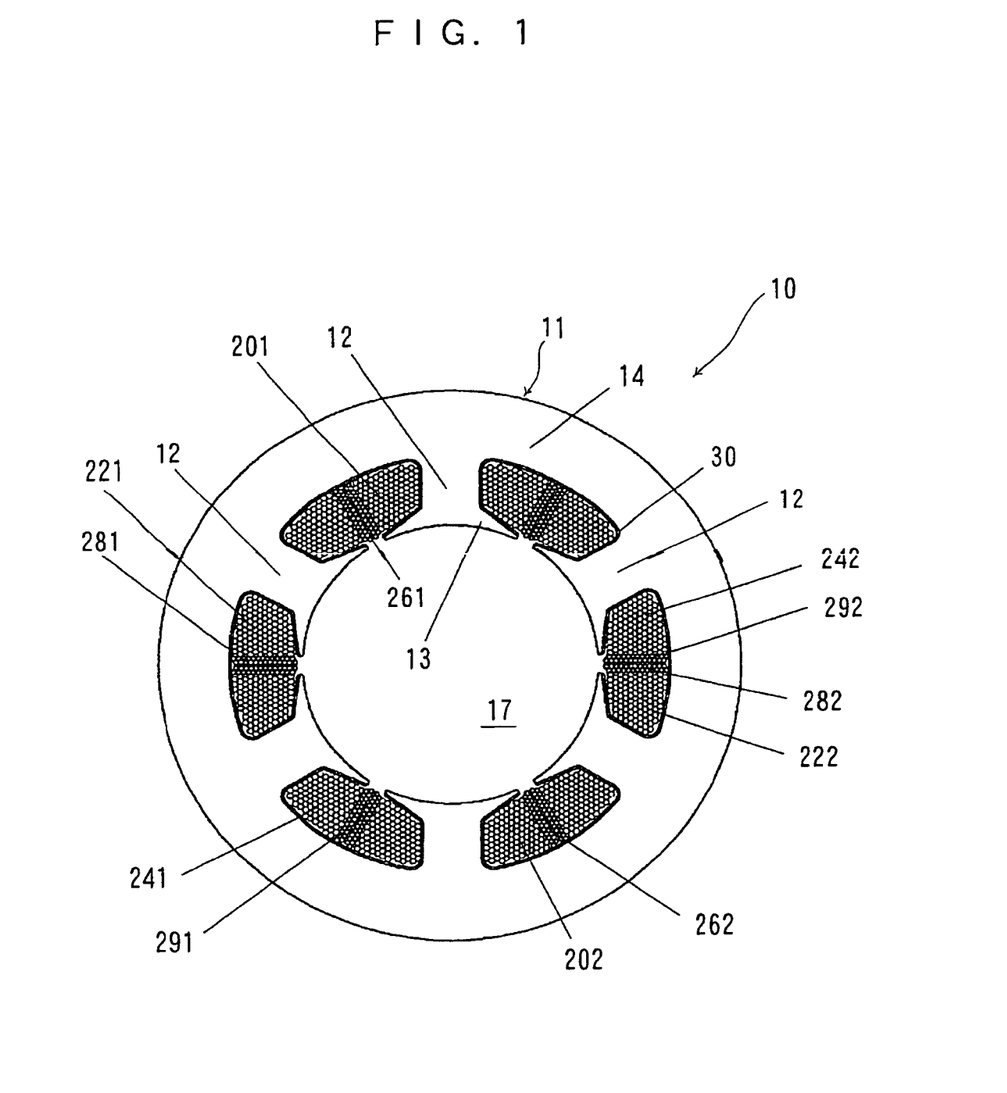
FIG. 1 is a sectional view showing a winding state of a motor stator of the present invention which has three phases, four poles, six slots, one magnetic pole, and two coils.
Figure 2:
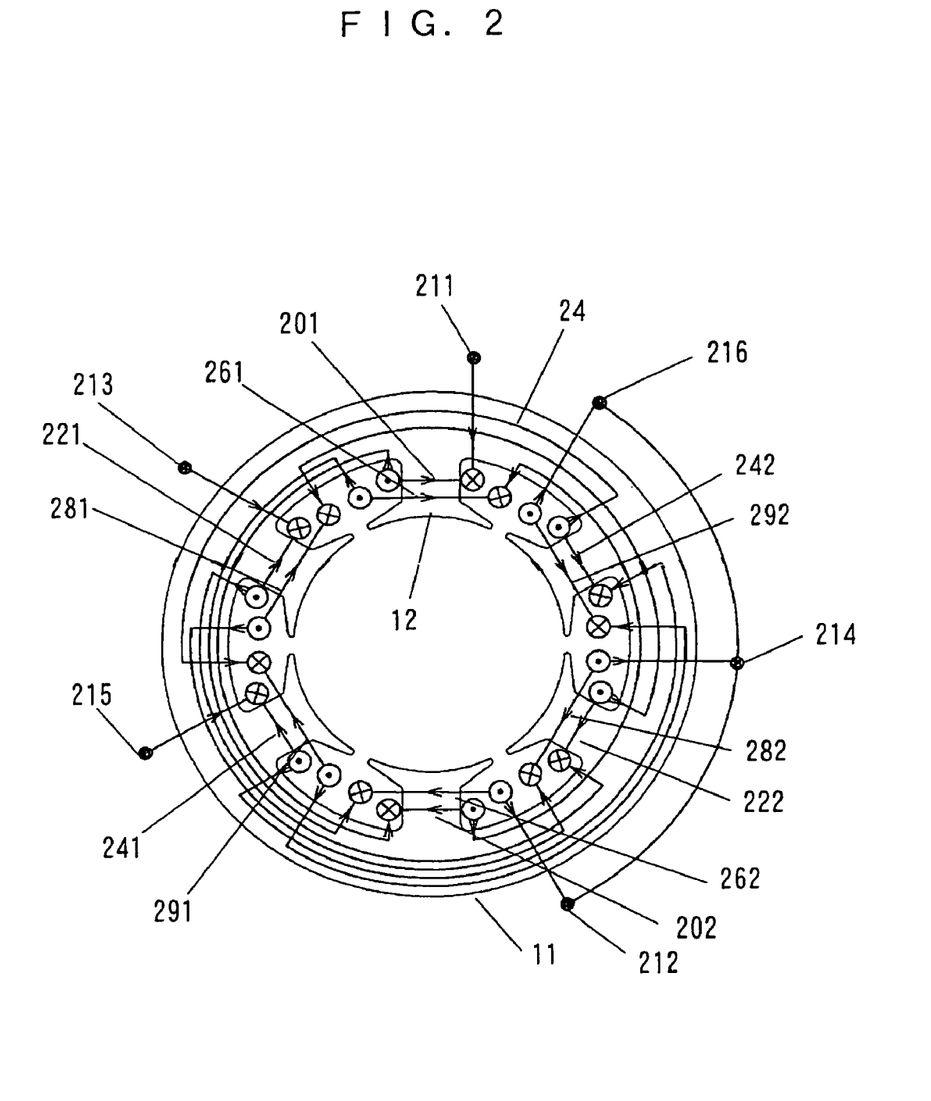
FIG. 2 is a connection diagram showing a series star connection of the motor stator of the present invention which has three phases, four poles, six slots, one magnetic pole, and two coils.
Figure 3:
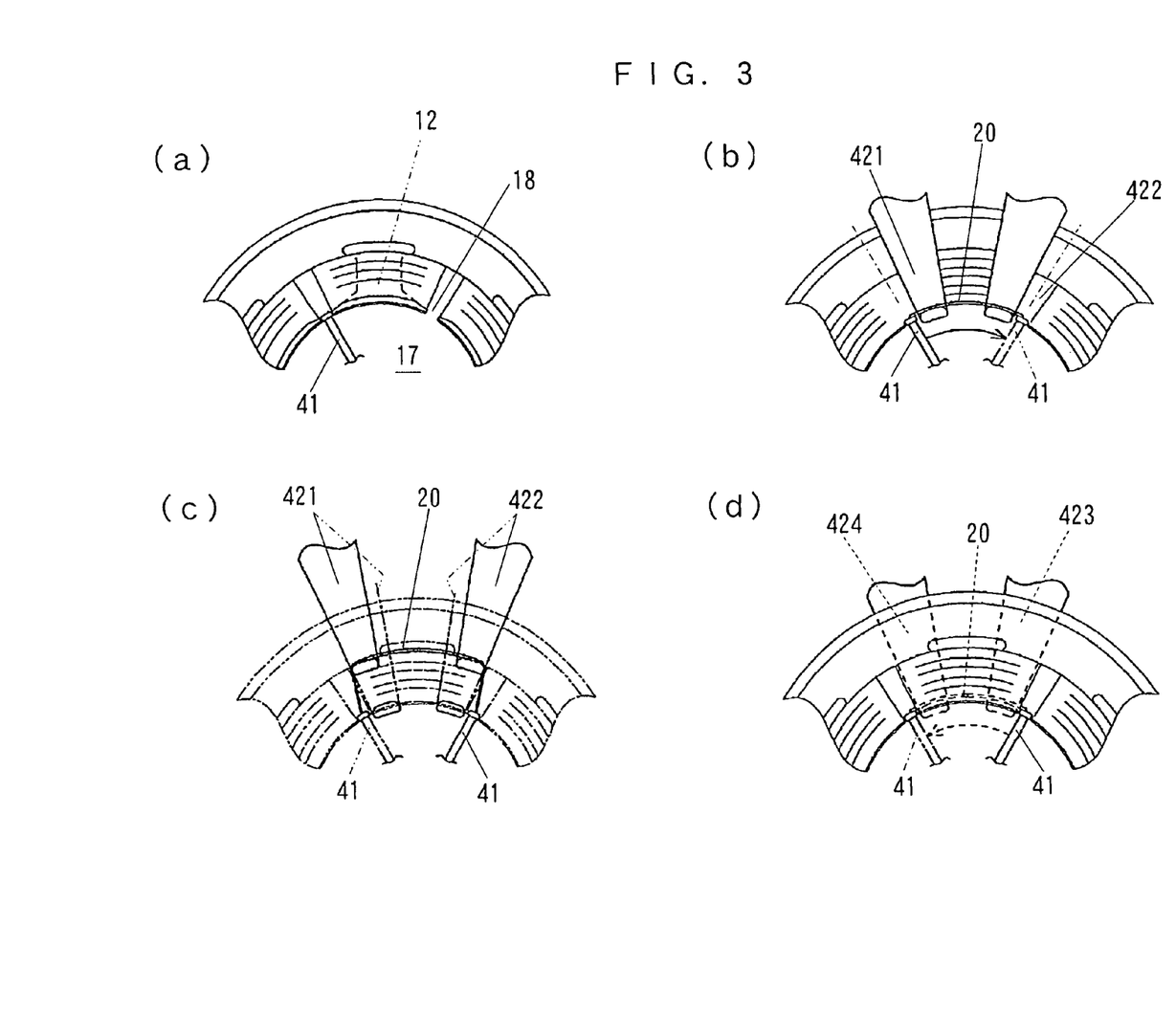
FIG. 3 is a partial plan view showing a first step (a), a second step (b), a third step (c), and a fourth step (d) in a second winding step of the present invention.

FIGS. 1 to 3 show (Embodiment 1) of the present invention.

FIG. 1 is a sectional view showing a winding state of a stator of a motor according to the present invention. The stator has three phases, four poles, six slots, one magnetic pole, and two coils.

A stator core 11 is constituted of magnetic poles 12 provided with windings, magnetic pole protrusions 13 which are disposed on the tips of the magnetic poles 12 normally with large widths, and a substantially annular yoke 14 for connecting the base ends of the magnetic poles 12.

A stator 10 formed by providing concentrated windings in the stator core 11 has first coils 201, 202, 221, 222, 241, and 242 which are directly wound around the magnetic poles 12 via insulators 30 and second coils 261, 262, 281, 282, 291, and 292 which are wound on the first coils 201, 202, 221, 222, 241, and 242.

The first coils 201, 202, 221, 222, 241, and 242 are wound according to a conventional nozzle winding method in a first winding step, and the second coils 261, 262, 281, 282, 291, and 292 are wound according to a method different from the nozzle winding method in a second winding step, which is performed after the first winding step.

Regarding a ratio of the first coil and the second coil of all the coils wound around one of the magnetic poles 12, an amount of the first coil is determined while an upper limit is set at an amount of the first coil when a nozzle interferes with the first coil during winding according to the nozzle winding method. Thus, winding is carried out while making the best possible use of the characteristic of the conventional nozzle winding method achieving high winding speed. Further, by carrying out in-slot nozzle oscillation winding, windings with a high coil space factor can be obtained while making the best possible use of windings achieving high controllability on the positions of coils.

FIG. 2 shows that the first and second coils are wound around one of the magnetic poles 12 and are star connected in series in the three-phase, four-pole, and six-slot configuration of FIG. 1.

In the first winding step of winding the first coils 201, 202, 221, 222, 241, and 242, winding is carried out simultaneously on the phases by using three nozzles according to the conventional nozzle winding method.

To be specific, among the coils 2 subjected to concentrated winding around the plurality of magnetic poles 12 provided in the stator core 11, firstly the first coils 201, 221, and 241 are densely wound around the magnetic poles 12 by the three nozzles while the nozzles are simultaneously rotated relative to the magnetic poles 12 in the slots. Thereafter, the coils are continuously connected via crossovers 24 and the nozzle winding method is similarly carried out simultaneously on the first coils 202, 222, and 242 by the three nozzles.

Besides, the method of rotating nozzles relative to the magnetic poles 12 includes a method of rotating the nozzles around the magnetic poles 12 and a method of rotating the stator core while synchronizing the stator core with the vertical movement of nozzles. A comparison between the methods indicates that the former achieves winding with higher winding speed.

Subsequently, while conductors are connected, the positions of the nozzles are moved again to the magnetic poles 12 where the first coils 201, 221, and 241 are wound, the nozzles are positioned in areas not interfering with the coils in the slots, and then the second winding step is performed.

The second winding step is performed in steps shown in FIGS. 3(a) to 3(d).

In FIG. 3(a), the nozzle 41 in the second winding step is positioned in an area not interfering with the coils to be wound. To be specific, FIG. 3(a) shows that the nozzle 41 is positioned in a slot open 18 between the adjacent magnetic protrusions 13. To supply a conductor to the magnetic pole 12 on this position, the nozzle 41 moves in the axial direction of the stator core 11 in the slot open 18 of the stator core 11 and moves in a horizontal direction on a coil end at some midpoint of winding, and the nozzle 41 performs limited rotation around the magnetic pole 12 to be subjected to winding.

As shown in FIG. 3(b), in the second winding step, hooks 421 and 422 having hook end portions freely opened and closed are provided above a coil end of the magnetic poles at some midpoint of winding. A conductor 20 supplied from the nozzle 41 is received by the hooks 421 and 422 while the nozzle 41 moves over the coil end according to the rotation.

Subsequently the nozzle 41 moves in the axial direction in the slot open 18 not interfering with the wound coil. When the nozzle 41 moves in the axial direction in the slot open 18, as shown in FIG. 3(c), the hooks 421 and 422 move toward the outer periphery of the stator core 11 from virtual line positions to solid line positions so that the conductor 20 reaches a prescribed coil winding position. Regarding the positions and moving directions of the hooks 421 and 422, the movement is made along the center lines of the slots on both sides of the magnetic pole 12, and the conductor 20 to be additionally wound is moved to the prescribed position in a positive manner. At this point of time, the hooks 421 and 422 open its hook end portions so that the coil is released from the hook end portions and is wound on the prescribed position.

The hooks 421 and 422 move to the outside substantially in a radial direction along the center lines of the slots on both sides of the magnetic pole 12, so that the hooks 421 and 422 move along winding spaces remaining in the slots. With this method, the conductor can be more precisely moved to the prescribed position as compared with a method of hanging a hook on a position serving as the center of the coil end of a conductor to be wound and moving the hook to a winding position. This is because the space remains in the slot until the end of winding and a movement in this direction prevents wound coils from interfering with winding.

The nozzle 41 indicated by a solid line of FIG. 3(c) moves downward, in the slot open 18, through the slot to the coil end shown in FIG. 3(d). As shown in FIG. 3(d), hooks 423 and 424 similar to the hooks 421 and 422 are positioned on the coil end side. The hooks 423 and 424 receive the conductor 20 from the nozzle 41 moving over the coil end.

Then, the nozzle 41 moves up to the position of FIG. 3(a) in the axial direction in the slot open 18. When the nozzle 41 moves in the axial direction in the slot open 18, the hooks 423 and 424 move to the outer periphery of the stator core 11 and the conductor 20 reaches the prescribed coil winding position. At this point, regarding the positions and the moving directions of the hooks 423 and 424, the hooks 423 and 424 are moved substantially in a radial direction along the center lines of the slots on both sides of the magnetic pole 12, and a coil to be additionally wound is readily moved by the hooks 423 and 424 to a prescribed position. At this point of time, the hooks 423 and 424 open its hook end portions so that the coil is released from the hook end portions and is wound on the prescribed position.

As described above, the moving directions of the hooks 423 and 424 are the same as those of the hooks 421 and 422 and the hooks 423 and 424 are moved in a direction along a winding space remaining in the slot. Thus, the conductor can be more precisely moved to the prescribed position as compared with the method of hanging a hook on a position serving as the center of the coil end of the conductor 20 to be wound and moving the hook to a winding position.

Thereafter, the operations of FIGS. 3(a) to 3(d) are repeated to carry out winding. The positional relationships between the hooks 421 and 422 and the hooks 423 and 424 greatly affect a space factor of wound coils. Thus, the operations of holding, moving, and opening of coils are synchronized with one another and winding is carried out so as to be controlled at the most proper position of the coil end.

Regarding the controllability of a coil winding position in the second winding step, instead of a lower layer of a coil that is a drawback of the conventional hook winding method disclosed in Japanese Patent Laid-Open No. 2000-270524, an upper layer of the coil that is close to the hooks 421, 422, 423, and 424 is subjected to winding according to the hook winding method. Thus, it is possible to obtain excellent controllability for a coil winding position and achieve a winding with a high space factor of coils.

As described above, in the first winding step, the first coils 201, 202, 221, 222, 241, and 242 are wound according to the nozzle oscillation winding method which achieves a larger winding number of turns and high controllability of a coil winding position. In the second winding step, the second coils 261, 262, 281, 282, 291, and 292 are wound on the first coils 201, 202, 221, 222, 241, and 242 according to the hook winding method which enables winding in the nozzle passage area of the first winding step. Hence, it is possible to carry out winding effectively using all the slot areas with a high space factor of coils.

Further, in the second winding step of hanging the coils on the hooks 421, 422, 423, and 424 and distributing the coils into the slots, the coils are wound around the plurality of magnetic poles 12 as follows: the coils 202, 222, 242 are simultaneously wound around the magnetic poles by the three nozzles and are continuously connected via the crossovers 24, and then the second coils 262, 282, and 292 are wound around the magnetic poles in a similar manner.

After the winding steps, winding start wires 211, 213, and 215 of the first coils are connected as power supply lines of the phases and winding end wires 212, 214, and 216 are connected as neutral points, so that a motor stator of series star connection is completed with three phases, four poles, and six slots.

Additionally, in the above-described embodiment, the nozzle 41 passes through the slot open 18. As long as the nozzle 41 does not interfere with the coil, the nozzle 41 may pass though a position other than the slot open 18 and the nozzle 41 may be disposed in a space 17 inside the stator core 11 and make limited rotation about the magnetic pole 12 to be subjected to winding. However, in this case, when the coils are hung on the hooks 421, 422, 423, and 424 and are distributed into the slots, the conductor 20 may be in contact with the magnetic pole protrusions 13, which constitute the slot open 18, and damage the coils. When the nozzle 41 is positioned in the slot open 18 and is rotated, the conductor is not damaged because the coil is directly supplied from the nozzle 41 into the slot, thereby readily obtain coils of excellent quality.

In the above embodiment, the nozzle 41 is rotated about the magnetic pole 12 of the stator core 11 in the second step. The second coils may be wound in series according to the hook winding method while the nozzle and the stator core are moved relative to each other. To be specific, the same operations as the first winding step are performed. Instead of the step of moving the nozzle 41 over the coil end, the stator core 11 may be rotated and moved while the nozzle 41 may be only moved vertically along the axial direction of the stator core 11.

EMBODIMENT 2

Figure 4:
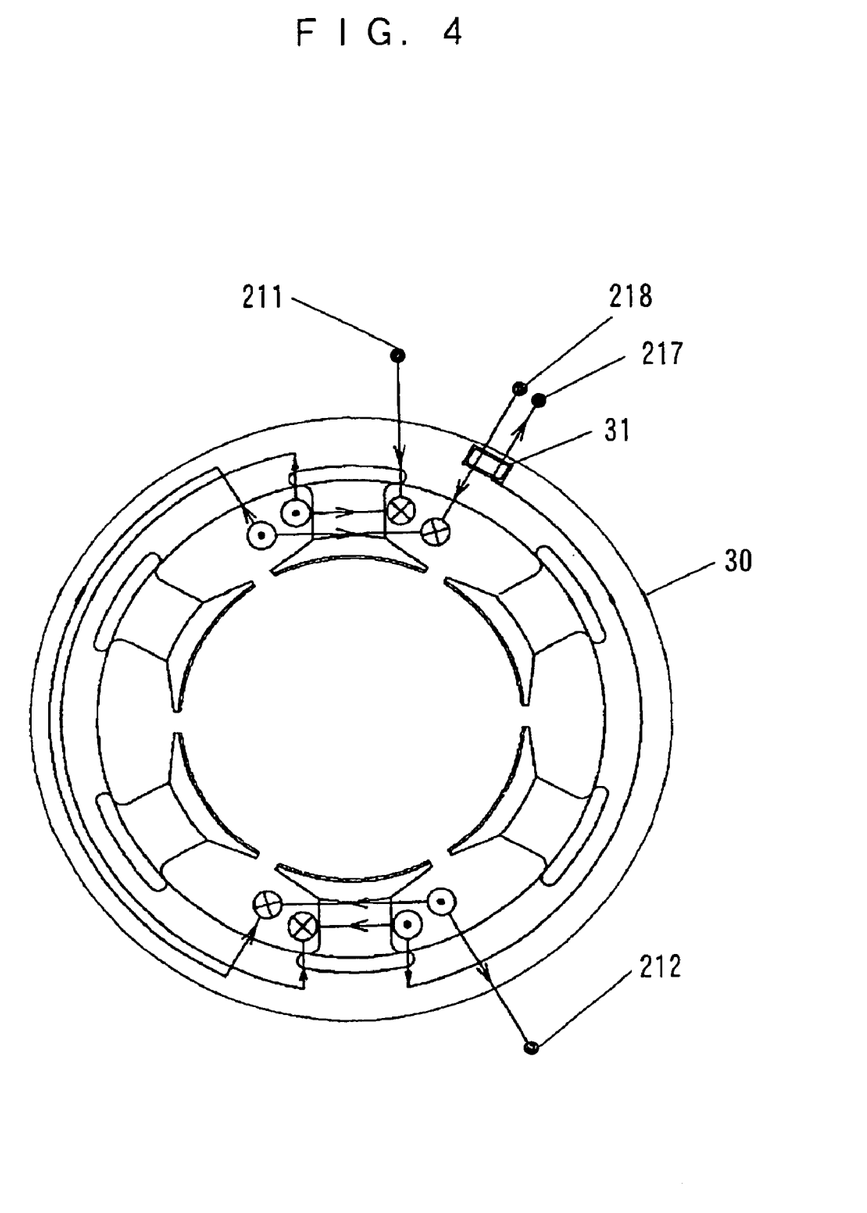
FIG. 4 is a connecting pattern diagram showing a connecting method having a connecting portion between the two coils of the present invention.

FIG. 4 shows (Embodiment 2).

In (Embodiment 1), the first coil of the first winding step and the second coil of the second winding step are wound as continuous conductors without being cut at some mid point. Separate steps may be provided so that terminal treatment of cutting coils and temporarily depositing the coils is carried out after the first coils are wound. After the second coils are wound in the subsequent step, the first coils and the second coils may be electrically connected with each other.

In this case, the last winding end wire of the first coils is cut while being deposited on a predetermined position and the first winding start wire of the second coils is deposited on the predetermined position. Then, on a retracting position from an interference area of the nozzle and the first coil, the second coil is wound while another nozzle is rotated relative to the magnetic pole.

Referring to FIG. 4, a connecting pattern having a connecting portion between two coils will be described as a specific method. FIG. 4 only shows coils of one phase.

After the winding of the first winding step, the last winding end wire 217 of wound coils is cut while being deposited on a terminal strip 31 provided on an insulator 30 or the like which is attached to the stator core 11.

Subsequently, the second winding step is performed on the stator, in which the first coils have been wound, after the nozzle is moved to the retracting position from the interference area of the nozzle and the first coil. In this step, winding is started after a first winding start wire 218 of the second coils, which is wound by a nozzle different from the nozzle of the first winding step, is deposited on the terminal strip 31. The conductors deposited to the terminal strip 31 are connected via terminals and so on, so that the coils are connected in series.

According to the above winding method, since the different nozzles are used to carry out winding in the winding steps, the first winding step and the second winding step can be readily divided on a production line and a resistance can be freely adjusted while selecting an optimum wire diameter for each of the winding steps.

Therefore, in this case, it is possible to form the most proper winding line without interfering with the high-speed winding of nozzle winding. For example, when one magnetic pole requires a larger coil winding number in the design of the motor, the conductors of the second winding step are made smaller in wire diameter than the conductors of the first winding step, thereby increasing the winding number.

EMBODIMENT 3

The problem of hook winding is controllability of a position of winding a coil. A major factor is sag appearing on a coil until the coil released from a hook is wound. Such sag inevitably occurs because the coil is not directly wound around a magnetic pole of a stator but the coil is temporarily deposited on the hook before being released and wound. As the hook is closer to a winding target, the influence decreases. However, the stator has a constituent element such as an insulator in reality and thus the operating range of the hook around the target is considerably limited.

A method of pulling back a conductor inserted in a nozzle 41 is available to absorb the sag of the coil. However, the coil is liable to damage because the conductor rubs against the internal passage of the nozzle 41 when the conductor inserted in the nozzle 41 is drawn back, resulting in a serious problem in the quality of the coil. Hence, it is desirable to control the coil supplied from the nozzle without pulling back the coil to the nozzle.

In FIG. 3(d) of (Embodiment 1), after the hooks 423 and 424 having moved onto the coil end receive the conductor 20, when the nozzle 41 moves in the axial direction of the stator core 11, the hooks 423 and 424 move to the outer periphery of the stator core 11 in a radial direction and reach the prescribed coil winding position. At this point of time, the hooks 421 and 422 of FIG. 3(c) open its hook end portions so as to release the conductor and the conductor is wound on the prescribed position.

However, there is some distance between the point of opening the hook end portions of the hooks 421 and 422 the point of winding the coil. The released coil acts as a slack wire and is left with no tension applied thereon until the nozzle 41 moves and winds the coil.

Thus, when the hook end portions of the hooks 421 and 422 are opened, the hooks 423 and 424 are moved in a direction of separating from the coil end along the axial direction, so that an amount of the conductor acting as a slack wire is absorbed immediately, tension is quickly applied to the released coil, and the coil is wound.

In this way, the hooks 421 and 422 and the hooks 423 and 424 on the coil ends repeat these operations. Thus, it is possible to perform the hook winding method with higher controllability of the coil winding position and carry out winding with a higher space factor of coils while effectively using all the slot areas.

Further, in the above-described embodiments, the first coils 201, 202, 221, 222, 241, and 242 are all wound around the magnetic poles 12 and then the second coils 261, 262, 281, 282, 291, and 292 are wound on the first coils. The following manufacturing method is also applicable: the first coils 201, 202, 221, 222, 241, and 242 are wound at a time by the nozzles 41 as many as the magnetic cores 12 of the stator core 11 according to the nozzle winding method, and the second coils 261, 262, 281, 282, 291, and 292 are wound on the first coils by the nozzles 41 as many as the magnetic poles 12 of the stator core 11 according to the hook winding method.

As described above, according to the present invention, in addition to areas where winding can be performed according to the nozzle winding method, coil winding is additionally carried out according to the hook winding method. Hence, it is possible to make the best possible use of the advantages of the winding methods, carry out winding with a high space factor in an area having various problems which are hard to solve by a conventional single method, and readily achieve a high-efficient motor which is not obtained by conventional methods.

Further, originally two or more coils wound around a magnetic pole are not regarded as divisions constituting one coil but as different coils. The coils are separately formed as coil groups connected by the respective winding methods, and then the coil groups are connected to each other. Thus, it is possible to directly wind the coils with a high space factor in the same series star connection as the conventional coil structure and achieve a stator having no faulty connection with a simple manufacturing method.

Moreover, according to the winding method for the stator of the motor in the present invention, it is possible to directly wind coils with a high space factor while utilizing all the slot effective areas in a small number of winding steps without the necessity for the passage through a slot open, thereby achieving a method of manufacturing a high-efficiency motor at low cost with few faulty connections and excellent quality of coils.

Further, according to the manufacturing method of the present invention, in a space having remained in the slot after the conventional nozzle winding, the position of winding the coil can be controlled without causing sag on the coil and winding is performed with a high space factor, thereby manufacturing a high-efficiency motor.

Besides, according to the manufacturing method of the present invention, the second coils are wound around the magnetic poles via the two hooks provided on the coil end and the conductors are moved substantially in a radial direction along the center lines of the slots on both sides of the magnetic pole. Hence, it is possible to move the conductor to a prescribed position more accurately and wind the conductor on a more precise position as compared with a method of hanging a hook on a position acting as the center of the coil end of a wound conductor and moving the hook to a winding position.

The invention claimed is:

1. A winding method for a stator of an electric motor, which is employed for carrying out stator windings around magnetic poles disposed radially in a stator core, the method comprising:

a first winding step of winding a first coil around a magnetic pole corresponding to a phase until a nozzle interferes with a wound conductor, the coil being wound according to a nozzle winding method of rotating, relative to the magnetic pole, the nozzle inserted in a slot formed by the adjacent magnetic poles and magnetic pole protrusions of the stator core;

a step of cutting a last winding end wire of the first coil while depositing the winding end wire on a predetermined position, and depositing a first winding start wire of the second coil on the predetermined position; and a second winding step of winding a second coil in series on the first coil, which has been wound in the first winding step, according to a hook winding method of moving a conductor supplied from the nozzle to a prescribed position by using a hook provided on a coil end of the stator core while rotating another nozzle relative to the magnetic pole on a position retracting from an interference area of the nozzle and the first coil.

2. The winding method for the stator of the motor according to claim 1, wherein the rotation of the nozzle relative to the magnetic pole in the first winding step is a rotation made by the nozzle.

3. The winding method for the stator of the motor according to claim 1, wherein the second coil wound in series with the first coil is wound around one magnetic pole in the second winding step by moving the conductor substantially in a radial direction along center lines of the slots adjacent to each other on both sides of the magnetic pole by using two hooks provided on the coil end.

4. The winding method for the stator of the motor according to claim 1, wherein the conductor supplied from the nozzle is moved to a prescribed position by a hook provided on the coil end of the stator core, the conductor held by the hook on the coil end of a winding side is released, and winding is carried out while a slack wire is eliminated by a hook holding the conductor on the other coil end.

5. The winding method for the stator of the motor according to claim 1, wherein winding is sequentially carried out continuously via a crossover in the first winding step or the second winding step.

* * * * *

UNITED STATES PATENT AND TRADEMARK OFFICE
CERTIFICATE OF CORRECTION

| | | |
|---|---|---|
| PATENT NO. | : 7,421,774 B2 | |
| APPLICATION NO. | : 10/529036 | |
| DATED | : September 9, 2008 | |
| INVENTOR(S) | : Akihiko Yamazaki et al. | |

It is certified that error appears in the above-identified patent and that said Letters Patent is hereby corrected as shown below:

On the title page item (73), should read:
    Matsushita Electric Industrial Co., Ltd., Osaka (JP)
    Hayashi Industrial Co., Ltd., Gifu (JP)

Signed and Sealed this

Fifteenth Day of December, 2009

David J. Kappos
*Director of the United States Patent and Trademark Office*